United States Patent [19]

Fekete et al.

[11] 4,193,969
[45] Mar. 18, 1980

[54] SELECTIVE NICKEL AND COBALT EXTRACTION FROM AQUEOUS ACIDIC SOLUTIONS

[75] Inventors: Simon O. Fekete; Gustavo A. Meyer, both of Arvada, Colo.

[73] Assignee: Amax Inc., Greenwich, Conn.

[21] Appl. No.: 741,344

[22] Filed: Nov. 12, 1976

[51] Int. Cl.² .................. C01G 51/00; C01G 53/00
[52] U.S. Cl. ..................... 423/139; 75/101 BE
[58] Field of Search ............... 423/139, 658.5; 75/101 BE

[56] References Cited

U.S. PATENT DOCUMENTS

| | | | |
|---|---|---|---|
| 3,399,055 | 8/1968 | Ritcey et al. | 423/139 |
| 3,810,827 | 5/1974 | Kane et al. | 423/DIG. 4 |
| 3,878,286 | 4/1975 | Morin et al. | 75/101 BE |
| 4,018,865 | 4/1977 | Gallacher | 423/139 |
| 4,120,817 | 10/1978 | Hummelstedt et al. | 423/139 |

FOREIGN PATENT DOCUMENTS 2236948  2/1975  France .................. 423/139

OTHER PUBLICATIONS

Flett et al., "Extraction of Metal Ions by LIX63/Carboxylic Acid Mixtures", in *Solvent Extraction*, vol. I, pp. 214–223, Society of Chemical Industry, London (1971).
Morrison et al., *Solvent Extraction in Analytical Chemistry*, pp. 29, 56, 57, John Wiley & Sons, New York (1957).

*Primary Examiner*—Brian E. Hearn
*Attorney, Agent, or Firm*—Michael A. Ciomek

[57] ABSTRACT

Nickel and cobalt are separated from aqueous process solutions having pH values below about 4 and containing other metal ions by contacting the process solutions with liquid organic extractants containing a mixture of α-hydroxyoximes and sulfonic acids dissolved in water-immiscible organic solvents.

26 Claims, 1 Drawing Figure

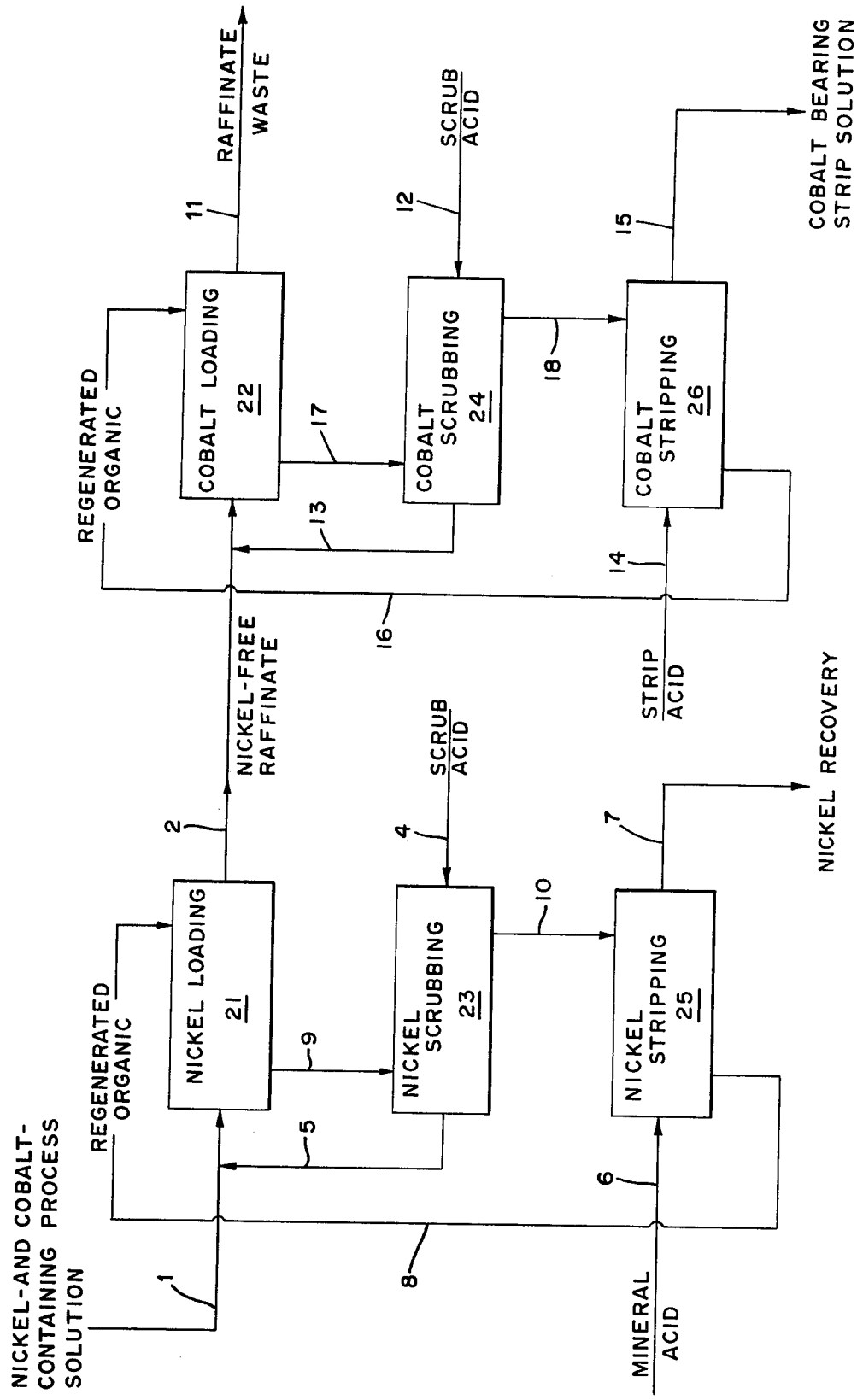

SELECTIVE NICKEL AND COBALT EXTRACTION FROM AQUEOUS ACIDIC SOLUTIONS

BACKGROUND OF THE INVENTION

1. Field of the Invention

The present invention relates to the recovery and/or separation of nickel and cobalt from acidic aqueous solutions and more particularly to the recovery of nickel and/or cobalt from acidic leach solutions by mixed organic extractants.

2. Prior Art

There are many processes for recovering nickel and cobalt from acidic aqueous solutions. These processes can be categorized generally as precipitation (including hydrogen precipitation), cementation, crystallization, electrolysis and organic phase extraction. Most, if not all, of these processes require substantial neutralization of any free acid contained in the aqueous solution to increase the rate and extent of nickel and/or cobalt recovery. Free acid neutralization significantly increases overall process capital and operating costs. The additional equipment required for neutralization increases capital costs, and increased consumption of sulfuric acid, neutralization reagents and by-product disposal all add to the operating costs.

An example of liquid extraction processes requiring neutralization is that described in French Pat. No. 2,236,948. The process described in this French patent extracts nickel and cobalt from acidic aqueous solution with a liquid organic extractant containing a carboxylic acid, a hydroxyoxime and a sulfonic acid, as a phase dispersant all of which are dissolved in a nonpolar solvent. The pH of the nickel-and/or cobalt containing aqueous solution is maintained at a value above 2.5. There is nothing in the French patent that would suggest that nickel and cobalt could be selectively extracted at pH values below 2.5, and advantageously at pH values of 2.0 or less.

BRIEF STATEMENT OF THE INVENTION

It has now been discovered that nickel and cobalt can be selectively extracted from acidic aqueous solutions having pH values of less than about 4, advantageously less about 2. Generally speaking, the present invention is directed to a process for recovering nickel and/or cobalt from acidic aqueous solutions. The aqueous solution is contacted with a liquid organic extractant containing an α-hydroxyoxime and a sulfonic acid dissolved in a water-immiscible organic solvent to extract metal value ions into the organic extractant from the aqueous solution.

DESCRIPTION OF THE DRAWING

The drawing is a flowsheet of a process embodying the present invention for separately recovering nickel and cobalt from an acidic leach solution.

DETAILED DESCRIPTION

Although the process in accordance with the present invention can be used to treat all nickel-and/or cobalt-containing acidic aqueous process solutions, the present invention will be described in terms of the treatment of pregnant acidic leach solutions containing nickel and/or cobalt. In addition to nickel and/or cobalt, the leach solutions can contain substantial amounts of iron, manganese, chromium, aluminum, and magnesium, minor amounts of other metals and significant amounts of free acid. Typical leach solutions from which nickel or cobalt can be recovered contain between about 1 gram per liter (gpl) and about 10 gpl nickel, between about 0.1 gpl and about 1 gpl cobalt, up to about 4 gpl iron, up to about 4 gpl manganese, up to about 20 gpl magnesium, up to about 8 gpl aluminum, up to about 2 gpl chromium and between about 3 gpl and 35 gpl free sulfuric acid.

The process in accordance with the present invention is advantageously used to treat process solutions having pH values below about 4, usually below about 2. In fact, it has been found that the separation of nickel and cobalt from other metals in the process solution is more complete if the pH value of the process solution is maintained below about 2, advantageously below about 1.5. Although the process of the present invention will extract nickel and/or cobalt from process solutions having pH values far lower than heretofore thought practical, the free acid concentration should be maintained below about 50 gpl as higher acid concentrations render the process less efficient. Other than an initial acid adjustment, further pre-treatment of the leach liquor is unnecesssry.

Extraction of nickel and/or cobalt from the leach liquor is effected by contacting the leach liquor with a liquid organic extractant, defined in greater detail hereinafter. Any apparatus that provides good liquid-liquid contact between the organic and aqueous phases can be used. Advantageously, the extraction process is conducted on a counter-current basis, either with a series of mixing-settling stages or in one or more extraction columns. Extraction can be conducted at ambient temperatures or at elevated temperatures up to about 80° C., advantageously the process is conducted at temperatures between about 100° C. and about 40° C.

Liquid organic extractants which can be employed contain α-hydroxyoximes and sulfonic acids dissolved in water-immiscible organic solvents. Tests have shown that the relative amounts of α-hydroxyoximes and sulfonic acids employed have an impact on both the selectivity and the extent of extraction (i.e., recovery). Acceptable selectivity and commercially attractive recoveries are achieved if the molar ratio of sulfonic acids to α-hydroxyoximes is maintained between about 1:4 and about 2:1. Best results are realized if the molar ratio of sulfonic acids to α-hydroxyoximes is maintained between about 1:2 and about 1:1. The liquid organic extractant can also contain other conditioners which perform specific functions. For example, conditioners such as tributylphospate or long chain alcohols (i.e. about 8 carbon atoms) can be incorporated in the organic extractant in amounts of up to about 20%, by weight, advantageously in amounts between about 0.5% and about 10%, by weight, to facilitate separation of the organic phase from the process solution after the metal value ions have been extracted from the aqueous phase.

The α-hydroxyoximes that are advantageously used can be symbolically represented as:

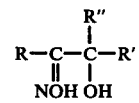

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and when alkyl are preferably attached to the carbons substituted with the —OH and =NOH groups through a secondary carbon atom. Examples of mono-and polyunsaturated radicals are heptenyl, octenyl, decenyl, octadecenyl and alkyl substituted radicals such as ethyloctadecenyl. Examples of other mono- and polyalkyl substituted saturated radicals are ethylhexyl, diethylheptyl, butyldecyl, butylhexadecyl, ethylbutyldecyl, butylcyclohexyl and the like. Specific examples of useful α-hydroxyoximes are 5,8-diethyl-7-hydroxydodecane-6-oxime, 19-hydroxyhexatriconta-9,27-dien-18-oxime and 5,10-diethyl-8-hydroxytetradecane-7-oxime.

The sulfonic acids incorporated in the organic extractant have the general formula:

wherein R is a hydrocarbon substituent and advantageously an aromatic hydrocarbon. Examples of useful sulfonic acids include dinonylnapthalenesulfonic acid and dodecylbenzene sulfonic acid.

The solvents should be immiscible with water, should dissolve substantial amounts of the α-hydroxyoximes and sulfonic acids, should be inert to concentrated mineral acid solutions, and should dissolve the nickel and cobalt reaction products formed when the aqueous phase is contacted with the organic phase. These properties are generally found in hydrocarbon solvents containing aliphatic and/or aromatic and/or cyclic compounds in any combination. Specific examples are kerosene, mineral spirits, naphtha, toluene, benzene and xylene.

The organic extractant should contain, on a weight basis, at least about 5%, α-hydroxyoximes, at least about 5% sulfonic acids and contain up to about 20% of at least one conditioner selected from the group consisting of long chain alcohols or tributylphosphate, all dissolved in a water-immiscible organic solvent. Advantageously, the liquid extractant contains about 5% and about 20% α-hydroxyoximes, between about 5% and about 20% sulfonic acids and between about 0.5% and about 20% of a conditioner, all dissolved in a water-immiscible organic solvent. Most advantageously, the liquid extractant contains between about 10% and about 20% α-hydroxyoximes, between about 10% and about 20% sulfonic acids and between about 2% and about 10% of a conditioner all dissolved in a water-immiscible organic solvent. Liquid extractants falling within the foregoing compositioned ranges are particularly advantageous in that they provide effective and efficient separation of nickel and cobalt from highly acid solutions while minimizing materials handling problems.

After substantially all of the nickel and cobalt have been extracted into the organic phase, the loaded extractant is separated from the treated process solution (raffinate). The raffinate can be treated to recover the other dissolved metals but the raffinate is advantageously recycled to earlier process stages where full advantage can be taken of the unneutralized acid as well as any free acid generated by the extraction of nickel and cobalt from the process solution.

The loaded extractant is treated to recover the nickel and cobalt value and to regenerate the liquid organic extractant for further use. Nickel and cobalt values contained in the loaded extractant can be recovered by contacting the loaded extractant with a concentrated aqueous solution of a mineral acid, such as sulfuric acid, hydrochloric acid, nitric acid or mixtures thereof. Stripping of the loaded extractant advantageously accomplished by using at least about 2 normal (N), and advantageously between 4 N and about 12 N, acid solutions. Stripping can be conducted batchwise, semicontinuously or continuously; in any event countercurrent principles are advantageously used. Equipment similar to that used for extraction can be employed for stripping. Nickel and cobalt can be recovered from the aqueous stripping solution by known processes, and the regenerated liquid organic extractant is recycled to extract further quantities of nickel and cobalt from the extractant solution.

Although nickel and cobalt can be stripped from the loaded organic extractant as the loaded extractant emerges from the loading stage, the loaded extractant is advantageously first scrubbed with an aqueous acid solution of intermediate strength e.g.; between about 0.5 N and about 4 N, to strip other metals from the loaded extractant. Scrubbing before stripping of nickel and cobalt assures nickel and cobalt products having acceptable purity levels. Scrubbing can be conducted in the same manner and in the same apparatus as described for stripping except that the scrubbing solution is not as concentrated as the stripping solution.

Not only is the process in accordance with the present invention useful in recovering both nickel and cobalt from acidic process solution, but it is also useful in separately recovering nickel and cobalt from process solutions and in separating nickel from cobalt from solutions containing both nickel and cobalt.

Separate recovery and separation of nickel and cobalt are accomplished by taking advantage of the higher affinity of sulfonic acid and α-hydroxyoxime mixtures toward nickel than that towards cobalt. Methods to achieve separation between nickel and cobalt include restricting the ratio of organic to aqueous phases in a first extraction stage so that substantially only nickel will extract, thereby leaving the bulk of the cobalt in the aqueous raffinate leaving the nickel extraction stage and performing a second extraction for cobalt in a separate operation. The separation can be enhanced by scrubbing the cobalt from the organic extract with an intermediate strength aqueous acid solution of 0.5 N to 4 N, merging the scrub solution with the raffinate from the nickel extraction and then performing a second extraction for cobalt on the combined raffinate and scrub solution streams. Alternatively, nickel and cobalt can be co-extracted to produce an aqueous raffinate substantially free of nickel and cobalt and a loaded organic extractant containing substantially all the nickel and cobalt but substantially free of other impurities, then contacting the loaded organic extractant with a strip solution of intermediate acid strength of 2 N to 6 N in a series of countercurrent stages to produce a strip solution containing substantially all the cobalt while leaving substantially all the nickel in the organic phase. Then the nickel-bearing organic extractant is stripped in a second stage with an aqueous acidic solution that is more concentrated than that employed in the cobalt stripping stage, advantageously 4 N to 10 N. Substantially all the nickel is stripped from the organic extractant while the organic extractant is regenerated for recycling to the extraction stage.

An advantageous combination of stages to achieve separation between nickel, cobalt and impurity elements is shown in the FIGURE. With reference to the FIG- URE, the blocks designated as Nickel Loading 21, Cobalt Loading 22, Nickel Scrubbing 23, Cobalt Scrubbing 24, Nickel Stripping 25, and Cobalt Stripping 26 represent a series of countercurrent contactors such as mixer-settlers, pulse columns, or similar devices commonly used in solvent extraction. The aqueous feed solution, (containing nickel, cobalt and impurity elements customarily encountered in solutions resulting from the hydrometallurgical treatment of nickel-and-cobalt-bearing ores) is introduced into nickel loading stage 21 where it is contacted with stream 8 which is an organic mixture containing sulfonic acid and α-hydroxyoximes as active ingredients. After a suitable number of countercurrent contacting stages, the aqueous raffinate, substantially free of nickel, leaves as stream 2 and is then introduced into cobalt-loading stage 22. The loaded organic extractant stream 9 leaving nickel-loading stage 21 contains substantially all the nickel with some impurity elements. Stream 9 enters nickel scrub stage 23 where it is contacted countercurrently with a scrub solution containing free acid, preferably between about 1 N and about 4 N. The volume of the scrub solution relative to the volume of the loaded organic extractant stream 9 can vary over a wide range depending upon its acid strength, the amount of impurities in the loaded extractant, the number of countercurrent stages and the amounts of sulfonic acid and α-hydroxyoximes contained in the organic phase. The objective being to remove substantially all the impurity elements contained in stream 9 with a minimum of nickel being removed. The scrub solution containing the scrubbed impurity elements emerges as stream 5, joins stream 1 entering the nickel-loading stage, and eventually exits in stream 2. The scrubbed organic stream 10 substantially free of impurity elements and cobalt, but containing substantially all the nickel introduced in stream 1 is introduced into stripping stage 25 where in countercurrent contact with an aqueous solution of a mineral strip acid 6, advantageously between about 4 N and about 10 N, the nickel is substantially completely removed from the organic phase and emerges as stream 7 which is further processed to recover a purified form of nickel. The stripped organic phase, which is now regenerated, leaves as stream 8 for another cycle in nickel-loading 21. Stream 2, the nickel-free raffinate, is conveyed to the cobalt circuit. The cobalt circuit is similar to the nickel circuit in its purpose and equipment arrangement. Thus stream 2 enters cobalt-loading stage 22, where in countercurrent contact with an organic extractant stream 16 substantially all the cobalt and some of the impurity elements are extracted into the organic phase. The nickel and cobalt free aqueous raffinate leaves as stream 11 and is discarded or suitably treated for recovery of other metals if justified. The loaded organic extractant stream 17 is scrubbed with an acidic solution 12 in a similar manner described for the nickel scrubbing. The scrub solution 13 joins stream 2 and eventually leaves the circuit in stream 11. The scrubbed organic extractant stream 18, substantially free of impurity elements, but containing substantially all the cobalt contained in stream 1, is then conveyed to cobalt stripping stage 26 where substantially all the cobalt is removed from the loaded organic extractant by countercurrent contacting with strip acid 14, producing an acidic cobalt solution 15 for further processing and cobalt recovery. The regenerated organic stream 16 is returned for another cycle to cobalt-loading stage 22.

It should be understood that the flowsheet depicted in the FIGURE and the description given above in no way represents a limitation or restriction to the particular arrangements shown. Numerous other configurations are possible depending upon the composition of the aqueous feed solution, desired purity of the nickel and cobalt products, the composition of the organic with respect to sulfonic acid and α-hydroxyoximes content and end use of the nickel and cobalt free aqueous raffinates.

In order to give those skilled in the art a better understanding of the advantages of the present invention, the following illustrative examples are given:

To facilitate ease of interpretation of the data contained in the examples, terminology customarily employed in solvent extraction was adopted. The terms used are defined as follows:

Concentrations are expressed in milliequivalents per liter. In the examples nickel, cobalt, manganese, magnesium and free sulfuric acid are present in their divalent form.

Distribution coefficients represent the arithmetic ratio of concentration of a species in the organic over that in the aqueous phase.

Separation factor represents the arithmetic ratio of the distribution coefficients of two species, or the ratio of one specie to a group of species, or a group of species to another group of species. This term is a measure of the degree of separation between species.

EXAMPLE 1

To illustrate the necessity for the presence of both sulfonic acid and α-hydroxyoximes in the organic extractant to achieve synergism with respect to extraction of nickel from aqueous acidic solutions, three tests were carried out. The aqueous feed solution (before contact with the organic phase) contained in milliequivalents per liter (meq/l) 207.9 $Ni^{2+}$, 16.9 $Co^{2+}$, 64.5 $Fe^{3+}$, 72.8 $Mn^{2+}$, 213.9 $Mg^{2+}$, 189.1 $Al^{3+}$, 19.0 $Cr^{3+}$, and 393.9 free $H_2SO_4$.

The aqueous solution (having a pH value of about 0.6) was contacted with an equal volume of organic extractant solution containing dinonylnaphthalenesulfonic acid or 5,8-diethyl-7-hydroxydodecane-6-oxime or both, all dissolved in naphtha, by shaking in a separatory funnel for about 5 minutes at about 40° C. and then allowed to separate, upon which the two phases were analyzed for their metal content. Table 1 shows the results obtained. The distribution coefficients clearly indicate that, when the sulfonic acid alone is used as an active ingredient in the organic, all elements extract more or less in equal proportion. No useful selectivity exists. Using the α-hydroxyoxime as the sole active agent yields no extraction into the organic phase, while the presence of both sulfonic acid and the α-hydroxyoxime gives rise to a surprising degree of synergism with respect to nickel and suppresses the extraction of iron, manganese, aluminum, chromium and, to a lesser extent, cobalt.

TABLE 1

| ORGANIC EXTRACTANT | | | | | | | | | | |
|---|---|---|---|---|---|---|---|---|---|---|
| SULFONIC ACID, Wt % | OXIME, Wt % | EXTRACTION STREAMS | Ni, Meq/l | Co, Meq/l | Fe, Meq/l | Mn, Meq/l | Mg, Meq/l | Al, Meq/l | Cr, Meq/l | Free Acid |
| 15 | — | Organic extract | 47.7 | 3.7 | 9.7 | 18.9 | 46.1 | 62.3 | 4.0 | — |
|  |  | Raffinate | 160.2 | 13.2 | 54.8 | 53.9 | 167.8 | 126.8 | 15.0 | 600.6 |
|  |  | Distribution Coefficient | 0.30 | 0.28 | 0.18 | 0.35 | 0.27 | 0.49 | 0.27 | — |
| — | 20 | Organic extract | Trace | Trace | Trace | Trace | Trace | Trace | Nil | — |
|  |  | Raffinate | 207.9 | 16.9 | 64.5 | 72.8 | 213.9 | 189.1 | 19.0 | 393.9 |
|  |  | Distribution Coefficient | 0 | 0 | 0 | 0 | 0 | 0 | 0 | — |
| 15 | 20 | Organic extract | 146.5 | 1.7 | 4.3 | Nil | 2.5 | 2.2 | Trace | — |
|  |  | Raffinate | 61.3 | 15.3 | 60.2 | 72.8 | 211.4 | 286.9 | 19.0 | 536.7 |
|  |  | Distribution Coefficient | 2.4 | 0.11 | 0.07 | φ | 0.01 | 0.01 | 0 | — |

EXAMPLE 2

The degree of selectivity with respect to nickel can be influenced by varying the proportion of α-hydroxyoximes in the organic relative to the sulfonic acid. Two series of tests were carried out using an aqueous feed solution described in Example 1, and varying the proportion of the sulfonic acid and the α-hydroxyoxime in the organic. The shake-out tests were carried out using the procedure described in Example 1.

In the first series, the sulfonic acid concentration in the organic phase was maintained constant at 15% by weight while the α-hydroxyoxime concentration was varied. The results obtained are depicted in Table 2A. For convenience and clarity, the impurity elements (including cobalt) were consolidated into one group contrasted with nickel. Table 2A clearly indicates that increasing the amount of α-hydroxyoxime relative to the sulfonic acid leads to increasing selectivity with respect to nickel.

TABLE 2

| Oxime in Organic Extractant, Wt. % | Constituent | Constituents in Organic Extract Meq/l. | Constituents in Raffinate, Meq/l. | Distribution Coefficient | Separation Factor |
|---|---|---|---|---|---|
| Nil | Nickel | 47.7 | 160.2 | 0.30 | |
|  | Impurities | 144.7 | 431.5 | 0.34 | 0.88 |
|  | Free Acid | — | 600.6 | — | |
| 5 | Nickel | 54.5 | 153.4 | 0.36 | |
|  | Impurities | 113.3 | 462.9 | 0.25 | 1.44 |
|  | Free Acid | — | 555.1 | — | |
| 10 | Nickel | 75.0 | 132.9 | 0.56 | |
|  | Impurities | 62.6 | 513.6 | 0.12 | 4.67 |
|  | Free Acid | — | 495.9 | — | |
| 15 | Nickel | 115.9 | 92.0 | 1.26 | |
|  | Impurities | 28.6 | 547.6 | 0.05 | 25.2 |
|  | Free Acid | — | 516.3 | — | |
| 20 | Nickel | 146.5 | 61.3 | 2.39 | |
|  | Impurities | 10.7 | 565.5 | 0.02 | 119.5 |
|  | Free Acid | — | 536.7 | — | |

In a second series of tests, the α-hydroxyoxime concentration in the organic was maintained constant at 20% by weight and the sulfonic acid concentration was varied. The results shown in Table 2B illustrate that, over the range of compositions shown, the selectivity for extraction of nickel can be dramatically influenced, and demonstrates (in conjuction with the data shown in Table 2A) that a variety of compositional combinations with respect to the sulfonic acid and the oxime in the organic can be employed. This feature can be advantageously exploited in tailoring the organic composition to suit a particular need.

TABLE 2B

| Sulfonic Acid in Organic Extractant, Wt. % | Constituent | Constituents in Organic Extract Meq/l. | Constituents in Raffinate, Meq/l. | Distribution Coefficient | Separation Factor |
|---|---|---|---|---|---|
| 5 | Nickel | 63.0 | 144.8 | 0.440 | 36.7 |
|  | Impurities | 6.5 | 569.7 | 0.012 | |
|  | Free Acid | — | 479.6 | — | |
| 10 | Nickel | 146.5 | 61.3 | 2.39 | |
|  | Impurities | 3.3 | 573.0 | 0.006 | 398.3 |
|  | Free Acid | — | 542.9 | — | |
| 15 | Nickel | 146.5 | 61.3 | 2.39 | |
|  | Impurities | 10.7 | 565.5 | 0.019 | 125.8 |
|  | Free Acid | — | 536.7 | — | |
| 20 | Nickel | 142.8 | 65.1 | 2.19 | |
|  | Impurities | 31.8 | 544.4 | 0.058 | 37.8 |
|  | Free Acid | — | 589.8 | — | |

EXAMPLE 3

The distribution coefficient of nickel is dependent on its concentration in the aqueous and organic phases. To demonstrate this relationship, a series of shake-out experiments were carried out in which the phase ratio, that is the volumetric ratio of aqueous to organic phase, was varied. The organic mixture consisted of, in weight percent, 15% sulfonic acid, 15% α-hydroxyoxime and 10% tributylphosphate dissolved in kerosene as a carrier. The aqueous feed solution contained, in milliequivalents per liter, 246.7 $Ni^{2+}$, 29.2 $Co^{2+}$, 69.3 $Fe^{3+}$, 66.3 $Mn^{2+}$, 241.0 $Mg^{2+}$, 180.1 $Al^{3+}$, 23.1 $Cr^{3+}$ and 408.2 free $H_2SO_4$.

After contacting by shaking in separatory funnels for about 5 minutes, allowing the phases to separate and analyzing the phases the results depicted in Table 3 were obtained. These results indicate that, with decreasing nickel concentration in the aqueous raffinate, an increasing proportion of the nickel is extracted into the organic phase, despite a very substantial increase in acidity. The same trend is noted for the impurity elements but to a lesser extent. This property can be very usefully exploited in a countercurrent solvent extraction circuit to produce an organic extract containing substantially all the nickel and an aqueous raffinate substantially free of nickel but containing substantially all of the impurity elements originally present in the aqueous feed solution.

TABLE 3

| Phase Ratio | Constituent | Constituents in Organic Extract Meq/l. | Constituents in Raffinate, Meq/l. | Distribution Coefficient | % Extracted Into Organic |
|---|---|---|---|---|---|
| 5:1 | Nickel | 148.2 | 217.1 | 0.68 | 12.0 |
|  | Impurities | 22.8 | 596.7 | 0.038 | 0.8 |
|  | Free Acid | — | 450.2 |  |  |
| 2:1 | Nickel | 133.9 | 179.8 | 0.74 | 27.1 |
|  | Impurities | 21.8 | 590.4 | 0.037 | 1.8 |
|  | Free Acid | — | 493.5 |  |  |
| 1:1 | Nickel | 119.6 | 127.1 | 0.94 | 48.5 |
|  | Impurities | 22.3 | 579.0 | 0.038 | 3.7 |
|  | Free Acid | — | 566.7 |  |  |
| 1:2 | Nickel | 91.3 | 64.1 | 1.42 | 74.0 |
|  | Impurities | 19.6 | 562.0 | 0.035 | 6.5 |
|  | Free Acid | — | 643.5 |  |  |
| 1:3 | Nickel | 76.7 | 16.7 | 4.59 | 93.2 |
|  | Impurities | 17.4 | 549.2 | 0.032 | 8.7 |
|  | Free Acid | — | 676.7 |  |  |
| 1:10 | Nickel | 24.4 | 2.7 | 9.04 | 98.9 |
|  | Impurities | 12.4 | 477.7 | 0.026 | 20.6 |
|  | Free Acid | — | 776.7 |  |  |

EXAMPLE 4

The synergism of the sulfonic acid α-hydroxyoxime mixture towards nickel also applies to cobalt. The degree of selectivity towards cobalt can be influenced by variations in the relative proportions of the sulfonic acid and α-hydroxyoxime in the organic mixture in much the same manner as for nickel.

A series of tests were carried out using an aqueous feed solution containing, in milliequivalents per liter, 19.0 $Co^{2+}$, 50.5 $Fe^{3+}$, 160.2 $Mn^{2+}$, 246.7 $Mg^{2+}$, 81.2 $Al^{3+}$, 16.2 $Cr^{3+}$, and 530.0 free $H_2SO_4$.

The organic extractant was varied with respect to relative amounts of sulfonic acid and α-hydroxyoxime contained in the extractant. The sulfonic acid and the α-hydroxyoxime were the same as those used in Example 1. The shake-out tests were carried out at 1:1 phase ratio; otherwise, in a similar manner as in the previous examples and yielded the results shown in Table 4.

The data confirms that cobalt behaves similarly to nickel, although a given organic extractant has less selectivity towards cobalt than nickel. This fact can be advantageously exploited to isolate nickel and cobalt into separate streams, substantially free of impurities.

TABLE 4

| Active Ingredients in Organic Phase Wt. % | | | | | | |
|---|---|---|---|---|---|---|
| Sulfonic Acid | α-hydroxyoxime | Constituents | Constituents in Organic Extract Meq/l. | Constituents in Raffinate, Meq/l. | Distribution Coefficient | Separation Factor |
| 15 | 10 | Cobalt | 5.77 | 13.23 | 0.436 | 6.81 |
|  |  | Impurities | 31.11 | 521.65 | 0.064 |  |
|  |  | Free Acid | — | 557.1 | — |  |
| 15 | 20 | Cobalt | 14.25 | 4.75 | 3.00 |  |
|  |  | Impurities | 8.29 | 546.47 | 0.015 | 200.0 |
|  |  | Free Acid | — | 546.9 | — |  |
| 10 | 20 | Cobalt | 12.56 | 6.45 | 1.947 | 194.7 |
|  |  | Impurities | 5.92 | 548.84 | 0.010 |  |
|  |  | Free Acid | — | 551.0 | — |  |
| 5 | 20 | Cobalt | 6.79 | 12.22 | 0.556 | 39.7 |
|  |  | Impurities | 7.49 | 547.27 | 0.014 |  |
|  |  | Free Acid | — | 546.90 | — |  |

EXAMPLE 5

In most practical applications, even though the organic mixture shows a high degree of selectivity towards cobalt and nickel, some impurities will co-extract with nickel and/or cobalt. Such co-extracted impurities can be scrubbed preferentially with comparatively weak acidic aqueous solutions.

Tests were carried out with an organic mixture consisting of 15% sulfonic acid, 10% α-hydroxyoxime, 5% isodecanol and the balance kerosene. This organic extractant was loaded with various elements to concentrations, in milliequivalents per liter, 119.3 $Ni^{2+}$, 3.1 $Co^{2+}$, 4.8 $Fe^{3+}$, 5.1 $Mn^{2+}$, 12.3 $Mg^{2+}$, 17.8 $Al^{3+}$ and 1.7 $Cr^{3+}$.

Aliquots of the above organic were contacted with 0.95 and 1.9 normal sulfuric acid solutions at various phase ratios. After separation and analysis of the two phases, the distribution of the nickel and the impurity elements were computed, giving the results shown in Table 5. It is evident from these results that impurity elements can be preferentially removed by a suitable combination of acid strength and phase ratio. In practice, a countercurrent extraction system is particularly suited to accomplish a substantially complete separation between nickel and impurity elements.

TABLE 5

| Acid Conc. in Scrub Solution N | Phase Ratio Organic/Aqueous | Distribution - % of Total | | | |
|---|---|---|---|---|---|
|  |  | Nickel | | Impurities | |
|  |  | Organic Phase | Aqueous Phase | Organic Phase | Aqueous Phase |
| 1.9 | 10:1 | 68.6 | 31.4 | 30.2 | 69.8 |
|  | 5:1 | 51.4 | 48.6 | 17.7 | 82.3 |
|  | 1:1 | 17.1 | 82.9 | 4.5 | 95.5 |
| 0.95 | 10:1 | 86.3 | 13.7 | 54.4 | 45.6 |
|  | 5:1 | 72.6 | 27.4 | 46.5 | 53.5 |
|  | 1:1 | 45.7 | 54.3 | 15.3 | 84.7 |

EXAMPLE 6

Following the extraction and purification stages described in the foregoing examples, the organic mixture containing nickel and/or cobalt (and substantially devoid of other impurity elements) can be stripped with a strong mineral acid solution, thus regenerating the organic and making it available for a new loading cycle. The strip solution will contain the nickel and/or cobalt in a high concentration, which can be further processed to yield the respective pure metals or metal salts as desired.

In a series of shake-out tests, an organic extractant containing, by weight, of 15% sulfonic acid, 15% α-hydroxyoxime, 10% tributylphosphate, the balance naphtha, and also containing 166 milliequivalents per liter of nickel, was contacted with an acid solution containing 8000 milliequivalents per liter hydrochloric acid. The shake-out tests were performed at various phase ratios, giving the results shown in Table 6. On the basis of this data, it is evident that the organic phase can be stripped substantially free of nickel, thus making it available for a new loading cycle, while producing an aqueous strip solution of high nickel content which can be treated for nickel recovery.

TABLE 6

| Aqueous to Organic, Volumetric Ratio | Nickel Content, Meq/l | |
|---|---|---|
| | Organic Phase | Aqueous Strip Solution |
| 5:1 | 1.7 | 32.9 |
| 1:1 | 5.8 | 160.2 |
| 1:2 | 11.6 | 308.8 |
| 1:5 | 42.6 | 617.0 |
| 1:10 | 62.7 | 1033.0 |
| 1:20 | 75.0 | 1820.6 |

The present invention has been described by reference to advantageous embodiments, and it is to be understood that modifications and variations can be employed without departing from the principles and scope of the invention, as those skilled in the art will readily understand. Accordingly, such modifications and variations are considered to be within the purview and scope of the invention and appended claims.

We claim:

1. A process for recovering at least one metal value selected from the group consisting of nickel or cobalt from an aqueous process solution having a pH value less than about 4 and containing other metal ions which comprises contacting the process solution with a liquid organic extractant containing an α-hydroxyoxime and a sulfonic acid dissolved in a water-immiscible organic solvent, the molar ratio of α-hydroxyoxime to sulfonic acid in the organic extractant being between about 4:1 and about 1:2, to selectively extract the metal value from the process solution.

2. The process as described in claim 1 wherein the pH of the process solution is less than about 2.

3. The process as described in claim 1 wherein the process solution is a pregnant leach solution.

4. The process as described in claim 3 wherein the pregnant leach solution is derived from leaching nickeliferous lateritic ores with sulfuric acid.

5. The process as described in claim 1 wherein the water-immiscible organic solvent is at least one member selected from the group consisting of kerosene, naphtha, mineral spirits, toluene, benzene, and xylene.

6. The process as described in claim 1 wherein the organic extractant contains at least one conditioner selected from the group consisting of long chain alcohols or tributylphosphate.

7. The process as described in claim 6 wherein the conditioner is present in the organic extractant in an amount between 2% and about 10% by weight.

8. The process as described in claim 1 wherein the α-hydroxyoxime is symbolically represented by:

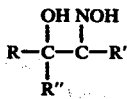

wherein R and R' are hydrocarbon radicals and R" is a hydrocarbon radical or hydrogen wherein the hydrocarbon radicals contain between 6 and 20 carbon atoms.

9. The process as described in claim 1 wherein the sulfonic acid is symbolically represented by:

R—SO$_3$H wherein R is a hydrocarbon substituent.

10. The process as described in claim 1 wherein the metal value ion is recovered from the organic phase by stripping the organic phase with a mineral acidic aqueous solution of at least about 2 normal.

11. The process as described in claim 1 wherein the acid aqueous solution is between about 4 normal and about 12 normal.

12. The process as described in claim 1 wherein the organic extractant containing the metal value ion is scrubbed with a weak acidic aqueous solution to scrub the other metal ions that might have been co-extracted with the metal value ion.

13. The process as described in claim 12 wherein the weak acidic aqueous solution has an acidic concentration between about 0.5 normal and about 4 normal.

14. The process as described in claim 1 wherein the process is conducted at a temperature between about 10° C. and about 40° C.

15. The process as described in claim 1 the process solution contains both nickel and cobalt ions and the amount of liquid organic extractant is controlled to selectively extract nickel from the process solution and thereafter extracting cobalt values with additional amounts of the liquid organic extractant.

16. A process for recovering a first metal value from an aqueous solution comprising a pair of said first metal value and a second metal value, said pair being selected from the group consisting of nickel and iron, nickel and cobalt, said process comprising contacting said aqueous solution at a pH of below about 4 with a solvent-extractant consisting of (i) an aliphatic α-hydroxyoxime, (ii) an aromatic sulfonic acid and (ii) a water-immiscible solvent for (i) and (ii) and metal complexes thereof to provide a solution of said first metal value in said solvent-extractant, the mole % of (ii) in the combined (i) and (ii) being in the range of 20 to 67; separating the solution thus formed from the aqueous raffinate depleted in said first metal value; and recovering said first metal value from said separated solution.

17. A process as defined in claim 16 wherein component (i) comprises an aliphatic α-hydroxyoxime of the formula:

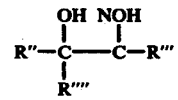

wherein R' and R" are organic hydrocarbon radicals and R"" is a hydrogen or a hydrocarbon radical.

18. A process as defined in claim 17 wherein said aliphatic α-hydroxyoxime is 5, 8-diethyl-7-hydroxydodecan-6-one oxime.

19. A process as defined in claim 16 wherein said aromatic sulfonic acid (ii) is a polyalkyl aromatic sulfonic acid.

20. A process as defined in claim 19 wherein said polysulfonic acid is dinonylnaphthalene sulfonic acid.

21. A process as defined in claim 16 wherein the mole % of (ii) in combined (i) and (ii) is in the range of 33 to 50.

22. A process as defined in claim 16 wherein said first metal value is recovered from said separated solution by acid stripping.

23. A process as defined in claim 16 wherein said pair comprises nickel and iron and said pH is in the range of 0.6 to 2.0.

24. A process as defined in claim 16 wherein said pair comprises nickel and cobalt and said pH is less than about 2.0.

25. A process for recovering nickel values from an aqueous solution comprising nickel values and cobalt values, said process comprising contacting said aqueous solution at a pH less than about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of about 50; separating the solution thus formed from the aqueous raffinate depleted in said nickel values; and recovering said nickel values from said separated solution by acid stripping.

26. A process for recovering nickel values from an aqueous solution comprising nickel values and iron values, said process comprising contacting said aqueous solution at a pH of less than about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of 20 to 67; separating the solution thus formed from the aqueous raffinate depleted in said nickel values; and recovering said nickel values from said separated solution by acid stripping.

* * * * *